United States Patent [19]

Wander

[11] Patent Number: 4,943,073
[45] Date of Patent: Jul. 24, 1990

[54] HAND TRUCK FOR TRANSPORTING HEAVY FLAT ARTICLES

[76] Inventor: Robert G. Wander, 3444 Dove Hollow Ct., Palm Harbor, Fla. 34683-2211

[21] Appl. No.: 351,148

[22] Filed: May 12, 1989

[51] Int. Cl.⁵ .............................................. B62B 3/02
[52] U.S. Cl. ................................................ 280/47.27
[58] Field of Search ............ 280/47.17, 47.131, 47.16, 280/47.34, 62, 63, 79.7, 47.27, 47.24, 47.23

[56] References Cited

U.S. PATENT DOCUMENTS

| | | | |
|---|---|---|---|
| 897,853 | 9/1908 | Vom Scheidt | 280/62 X |
| 2,028,023 | 1/1936 | Smith | 280/47.27 |
| 2,466,149 | 4/1949 | Burg | 280/79.7 |
| 2,816,771 | 12/1957 | Hunt | 280/47.131 |
| 3,090,635 | 5/1963 | Masterson, Jr. | 280/47.131 |
| 3,841,651 | 10/1974 | Bigney | 280/47.16 |
| 4,398,768 | 8/1983 | Parks et al. | 280/47.16 X |
| 4,426,099 | 1/1984 | Gross | 280/47.17 X |
| 4,488,733 | 12/1984 | Hellsten | 280/79.7 X |
| 4,630,838 | 12/1986 | Stockton | 280/47.17 |
| 4,793,624 | 12/1988 | Mace | 280/79.7 X |

FOREIGN PATENT DOCUMENTS 73045  8/1916  Switzerland ..................... 280/79.7

Primary Examiner—Charles A. Marmor
Assistant Examiner—Michael Mar
Attorney, Agent, or Firm—Joseph C. Mason; Ronald E. Smith

[57] ABSTRACT

A two-wheeled hand truck controllable by a single individual for transporting large flat boards. One or more boards are supported on edge by an angle iron member that is positioned below the plane of the axle upon which the wheels are mounted. A triangular frame member includes two frame members upon which the planar surface of the board rests. The frame members are inclined from the vertical to place the center of gravity of the board between the two wheels.

10 Claims, 2 Drawing Sheets

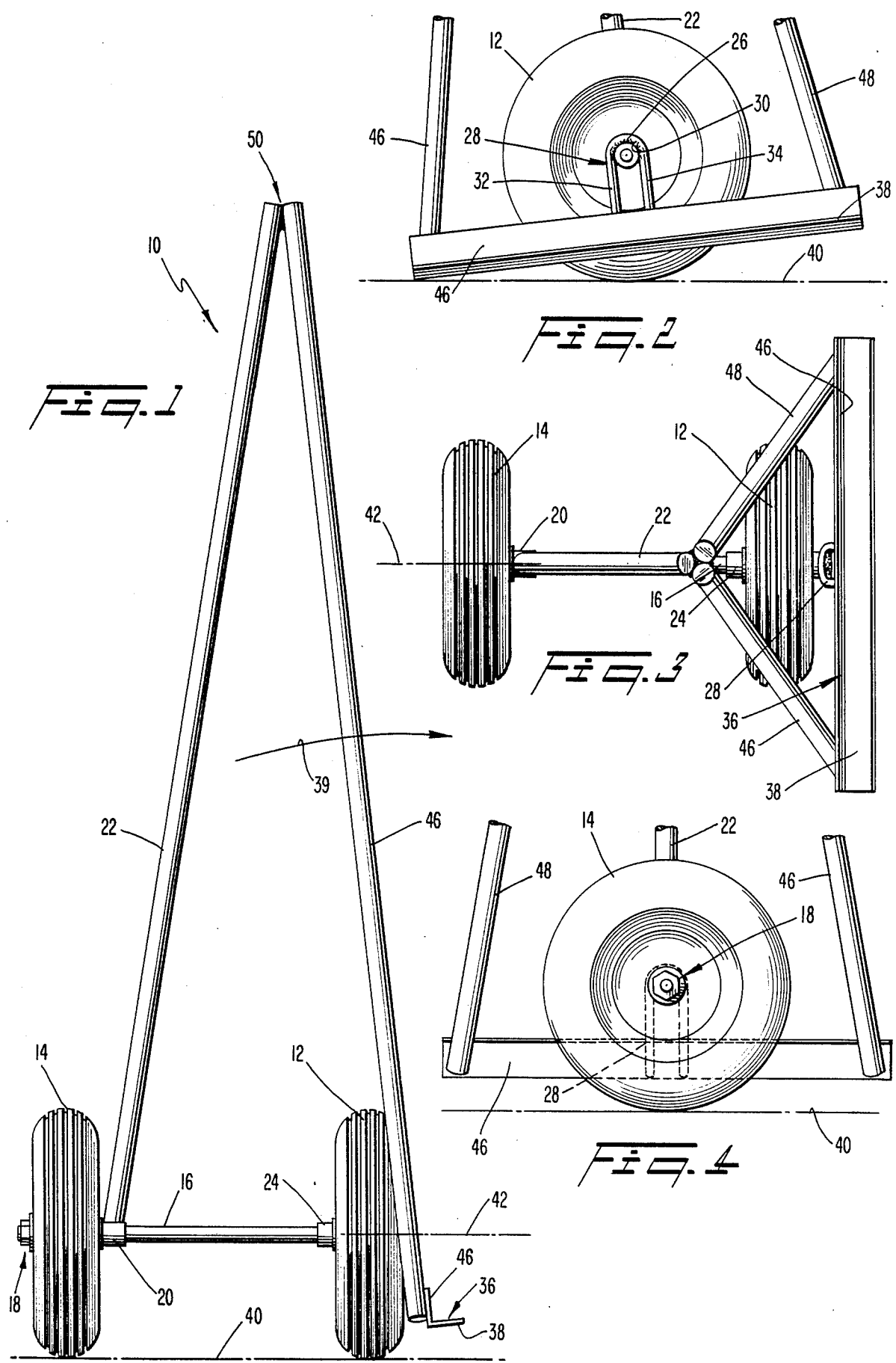

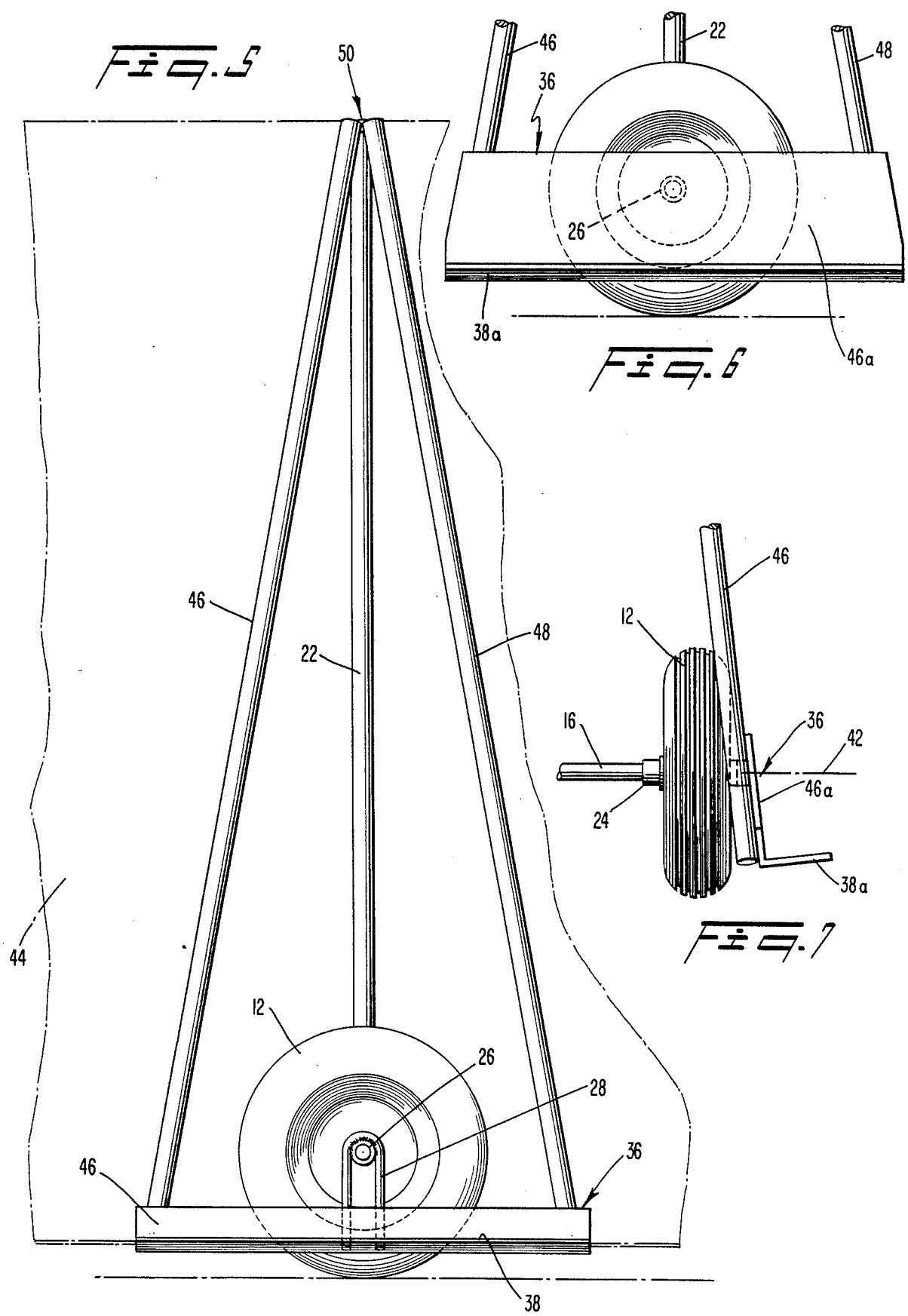

HAND TRUCK FOR TRANSPORTING HEAVY FLAT ARTICLES

TECHNICAL FIELD

This invention relates, generally, to hand trucks having utility in the transportation of large, flat articles such as sheets of plywood.

BACKGROUND ART

Large, planar in configuration articles such as sheets of plywood or other heavy boards or articles of similar configuration are commonly handled at construction sites. Although two individuals can move such articles without a high degree of difficulty, there exists a need for a tool that would enable a single individual to transport such an article.

Inventors have developed numerous hand trucks capable of transporting articles. For example, U.S. Pat. No. 394,385 to McMillin discloses a truck having two wheels that are aligned at right angles to the plane of the flat article being carried. U.S. Pat. No. 897,853 to Vom Scheidt is likewise of interest for its wheel set-up.

Further disclosures of two-wheeled hand trucks having utility in moving heavy boards and similar articles are shown in U.S. Pat. Nos. 3,090,635 to Masterson, Design Patent No. 208,770 to Curtis, U.S. Pat. Nos. 4,426,099 to Gross, 4,630,838 to Stockton and Canadian patent No. 804,473.

Although the art is quite well developed, there remains a need for a hand truck that facilitates its loading and unloading, which is easily steerable by a single individual, and which is of elegant construction.

DISCLOSURE OF INVENTION

The longstanding need for a hand truck not subject to the limitations of the prior art devices is now fulfilled by an apparatus having two wheels, an upstanding triangular frame, and a board support member such as an angle iron.

The wheels of the novel hand truck are rotatably mounted at opposite ends of an axle member, generally, but one of the wheels is mounted in spaced relation to the end of the axle to which it is rotatably mounted. A non-rotatable collar member occupies the space at the end of the axle, and an inverted "U"-shaped connector member is fixedly secured to the collar. More particularly, the bight of the connector overlies the collar member and the parallel arms thereof depend downwardly therefrom, i.e., the connector member lies in a plane normal to the axis of rotation of the axle member.

An angle iron is fixedly secured, about mid-length thereof, to the connector and is oriented in a substantially horizontal plane that is normal to the axis of rotation of the axle member. The length of the depending arms of the connector member is slightly less than the common radius of the wheels of the hand truck. Thus, the angle iron is spaced just upwardly of a support surface such as the ground when a board is being transported.

The opposite ends of the angle iron are respectively fixedly secured to forward and rearward vertically inclined frame members that converge at their respective uppermost ends with a third vertically inclined frame member that extends upwardly from the opposite end of the axle member.

The three frame members have a length such that they converge at a predetermined location above the axle and angle iron so that they can be grasped and manipulated by an individual using the truck without bending over. Moreover, the point of convergence is just inwardly of the wheel contiguous to the connector member so that ample leverage is provided for the handling of heavy boards. The truck is tipped toward the angle iron, so that the angle iron abuts the ground and the wheel remote from the angle iron is lifted from the ground, when a board is loaded; it is tipped back into its equilibrium position after the board has been loaded thereon. The board is held against the frame members secured to the angle iron as the lifted wheel is lowered back to the ground. The triangular arrangement of the frame members serves to position the center of gravity of the board between the two wheels.

It is the primary object of this invention, therefore, to advance the art of hand trucks in general and the art of hand trucks for large planar objects in particular.

The invention accordingly comprises the features of construction, combination of elements and arrangement of parts that will be exemplified in the description set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is a front elevational view of a first embodiment of the invention;

FIG. 2 is a partial side elevational view of the embodiment shown in FIG. 1;

FIG. 3 is a plan view of the embodiment shown in FIG. 1;

FIG. 4 is a partial side elevational view similar to FIG. 2 but showing the rearward side of the angle iron;

FIG. 5 is a full side elevational view of the embodiment of FIG. 1, showing a planar in configuration article thereon;

FIG. 6 is a side elevational view similar to FIG. 2, but showing an alternative embodiment of the invention; and FIG. 7 is a partial front elevational view showing another alternative embodiment of the invention.

Similar reference numerals refer to similar parts throughout the several views of the drawings.

BEST MODES FOR CARRYING OUT THE INVENTION

Referring now to FIG. 1, it will there be seen that an illustrative embodiment of the inventive apparatus is denoted 10 as a whole.

Device 10 includes at least two wheels 12,14 in its preferred form, although as this description proceeds it will become apparent that the device could be designed to have but one wheel, or to have more than two.

Wheels 12,14 are interconnected by axle member 16. Wheel 14 is mounted to axle 16 by a bolt and washer collectively denoted 18 or by other suitable means. A non-rotatable collar member 20 is mounted on axle 16 in closely spaced relation to wheel 14 as shown. Collar member 20 maintains wheel 14 in position and also serves as a mounting member to which the lowermost end of elongate frame member 22 is fixedly secured by welding or other suitable means.

Non-rotatable collar means 24 and 26 similarly maintain wheel 12 against lateral displacement. A "U"-shaped bracket or connector member 28 (FIG. 2) has a bight 30 fixedly secured to collar 26; transversely spaced apart, substantially parallel arm members 32,34 are integral with bight 30 and depend therefrom as illustrated.

A board support means in the form of an angle iron member 36 is fixedly secured, substantially at its midpoint, to arm members 32,34. Accordingly, generally horizontal wall 38 of angle iron 36 is positioned above support surface or ground 40, and below the axis of rotation 42 (FIG. 1) of axle 16.

The at rest position of the novel hand truck is depicted in FIG. 2.

Thus it is seen that the function of connector member 28 is to position generally horizontal wall 38 of angle iron 36 between ground 40 and axle 16. Preferably, angle iron 36 is positioned close to the ground to facilitate the loading of a heavy board 44 (FIG. 5) onto wall 38 when hand truck 10 is tipped in the direction of directional arrow 39 (FIG. 1).

Accordingly, connector member 28 could be eliminated and other means could be employed to position wall 38 in its desired position.

As depicted in FIGS. 1-5, generally vertical wall 46 of angle iron 36 is fixedly secured to depending arms 32,34 of connector 28. However, as depicted in FIGS. 6 and 7, connector 28 is eliminated and vertical wall 46a of angle iron 36 has an increased extent and is fixedly secured directly to collar member 26. FIG. 7 also depicts a broader horizontal wall 38a that enables the transportation of more than one board at a time.

Various other means of positioning angle iron 36 in its operative disposition between ground 40 and the axis of rotation 42 of axle 16 will also be apparent to those skilled in the art of machine design.

Vertical wall 46 is laterally inclined toward wheel 12 as shown; since horizontal wall 38 is orthogonal thereto, said wall 38 is slightly upwardly inclined relative to a horizontal plane. Thus, board 44 (FIG. 5) is inclined with respect to a vertical plane when resting against frame members 46,48 as perhaps best understood in connection with FIGS. 1 and 3; this orientation of angle iron 36 insures that the center of gravity of board 44 will be between wheels 12 and 14 as is desired to inhibit unintentional unloading of the board 44 from the hand truck 10.

Frame members 46,48 are inclined at the same angle as wall 46 of angle iron 36. All the frame members converge at apex 50 (FIGS. 1 and 5). As shown in FIG. 3, an imaginary vertical line drawn through the center of apex 50 intersects the axis of rotation 42 of axle 16 about ¼ of the way along the extent of axle 16.

Thus, when a heavy board is to be transported, the truck 10 is tipped in the direction of arrow 39 in FIG. 1 so that wheel 14 lifts from the ground and wall 38 of angle iron 36 is brought into abutting engagement with the ground so that the board can be easily lifted into position. The lower edge of the board is placed atop wall 38 and the planar surface thereof is brought into abutting engagement with frame members 46,48. The truck 10 is then tipped back into its equilibrium position, i.e., wheel 14 is returned to the ground while one hand is used to maintain the board 44 in its abutting relation to frame members 46,48. All tipping is accomplished preferably by manipulation of frame members 26,46 and 48, which extend sufficiently upwardly to enable their manipulation in the absence of bending. The length of the frame members also provides ample leverage with which to accomplish the needed tipping.

The preferred angle of inclination of frame members 46,48 is about 20 degrees and the preferred angle of inclination for frame member 22 is about 30 degrees.

Wheel 14 thus provides enhanced stability when hand truck 10 is in motion and enables it to be self-standing when it is not.

Wheel 14 could be eliminated and the resulting structure would still come within the scope of this invention but such structure would be unstable. Additional wheels could also be added. For example, a three-wheeled, triangular base means could be built, as could a square or rectangular four-wheeled base means, and such extra-wheeled devices would still come within the scope of the following claims, as would numerous other embellishments to this novel structure.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A two-wheeled hand truck, comprising:
   an axle member having first and second opposite ends;
   first and second laterally spaced wheel members rotatably mounted to said first and second ends of said axle member, respectively, for transporting the hand truck relative to a support surface;
   a non-rotatable mounting means fixedly secured to said first end of said axle member, laterally outward of said first wheel member;
   said mounting means being inclined laterally inwardly at a first predetermined angle;
   an elongate "L"-shaped angle iron member, having a substantially vertical wall and a substantially horizontal wall, being secured, substantially mid-length thereof, to said mounting means in substantially orthogonal relation to an axle of rotation of said axle member with said vertical wall of said angle iron member extending at said first predetermined angle;
   said angle iron member having longitudinally spaced apart forward and rearward opposite ends;
   a first, linear in configuration, elongate frame member having a lower end fixedly secured to said forward end of said angle iron member, on a laterally inward side thereof;
   said first frame member being inclined laterally inwardly at said first predetermined angle and rearwardly at a second predetermined angle;
   a second, linear in configuration, elongate frame member having a lower end fixedly secured to said rearward end of said angle iron member, on a laterally inward side thereof;

said second frame member being inclined laterally inwardly at said first predetermined angle and forwardly at said second predetermined angle;

a third, linear in configuration, elongate frame member having a lower end non-rotatably mounted to said second end of said axle member, laterally inwardly of said second wheel member;

said third frame member being inclined laterally inwardly only at said second predetermined angle;

said first, second and third frame members having upper ends disposed in abutting relation to one another in vertically spaced relation to a point about one-third of a distance from said first wheel member to said second wheel member;

whereby a flat board having a lower edge supported by the horizontal wall of said angle iron member is tilted laterally inwardly by said first predetermined angle and is supported by said first and second frame members along diagonal lines.

2. A hand truck, comprising:

a pair of laterally spaced wheel members;

an axle member interconnecting said wheel members, said wheel members being rotatably mounted to opposite ends of said axle member;

a non-rotatable mounting means, that axially receives said axle member, being positioned at a first end of said axle member, laterally outward of a wheel member adjacent said first end;

a connector means fixedly secured to said mounting means;

said connector means being disposed in depending relation to said mounting means;

said connector means being laterally inwardly inclined at a first predetermined angle;

an elongate, "L"-shaped horizontally disposed support means, having a substantially vertical wall and a substantially horizontal wall, disposed substantially normal to an axis of rotation of said axle member;

said support means fixedly secured to said connector means substantially mid-length of said support means with said vertical wall of said support member extending at said first predetermined angle;

said support means being disposed above a support surface upon which said hand truck is transportable and below an axis of rotation of said axle member;

a handle means fixedly secured to said support means for facilitating the manipulation of said hand truck;

said handle means including a pair of elongate frame members that are laterally inwardly inclined at said first predetermined angle;

said pair of frame members having respective lowermost ends fixedly secured to opposite ends of said support means, on laterally inward sides thereof;

said pair of frame members being inclined toward one another and having respective uppermost ends that abut one another;

said pair of frame members being laterally inwardly inclined at said first predetermined angle;

said handle means further including a third elongate frame member;

a lowermost end of said third frame member being non-rotatably secured to said axle member at a second end of said axle member, slightly laterally inwardly of a wheel member mounted adjacent said second end;

said third frame member being laterally inwardly inclined only at a second predetermined angle and having an upper end disposed in abutting relation to said uppermost ends of said pair of frame members;

said second predetermined angle being greater than said first predetermined angle so that said respective uppermost ends of said frame members abut one another remote from said axle member second end.

3. The hand truck of claim 2, wherein said support means is an angle iron member and wherein a first wall of said angle iron member is fixedly secured to said connector means and a second wall of said angle iron member projects outwardly therefrom in orthogonal relation thereto.

4. The hand truck of claim 3, wherein said non-rotatable mounting means is a collar member journaled to said axle member, and wherein said connector means is a "U"-shaped member having a bight portion fixedly secured to said collar member in surmounting relation thereto and having transversely spaced, parallel arm members depending to said bight portion, said angle iron member being secured to said arm members substantially mid-length of said angle iron member.

5. A hand truck, comprising:

an axle member having first and second, laterally spaced apart opposite ends;

a pair of wheel members rotatably mounted to said opposite ends of said axle member and being laterally spaced apart from one another by a predetermined distance;

an elongate, "L"-shaped, generally horizontally disposed support means having a substantially vertical wall and a substantially horizontal wall;

said support means being disposed in a plane normal to the axis of rotation of said axle member;

said support means being in upwardly spaced relation to a support surface over which said hand truck in transportable and in downwardly spaced relation to a horizontal plane including the axis of rotation of said axle member;

said support means being disposed in laterally outwardly spaced relation to a first preselected wheel member mounted to said first end of said axle member;

mounting means for maintaining said support means in said disposition;

a handle means for facilitating transportation of said hand truck over a support surface;

said handle means including a first, second and third elongate frame member;

said first and second frame members having their respective lowermost ends secured to opposite ends of said support means on a common, laterally inward side thereof;

said third frame member having its lowermost end non-rotatably secured to said second end of said axle member in laterally inwardly spaced relation to a second preselected wheel member;

said first, second and third frame members being linear in configuration and being inclined toward one another;

said frame members having respective uppermost ends that abut one another at a preselected point;

said support means being disposed in a plane substantially orthogonal to a plane including said first and second frame members;

said first and second frame members being laterally inwardly inclined at a common, first predetermined angle, and being further inclined toward one another;

said substantially vertical wall of said support means extending at said first predetermined angle;

said third frame member being laterally inwardly inclined only at a second predetermined angle that is greater than said first predetermined angle;

said respective uppermost ends of said first, second and third frame members abutting one another at a point remote from said second end of said axle member;

said point being vertically and upwardly spaced relative to said axle member and being disposed laterally inwardly relative to said first wheel member by a distance substantially equal to one-third the predetermined distance between said first and second wheel members;

whereby a large flat article is transported by a single individual using said hand truck, an edge of said article being supported by said horizontal wall of said support means and a side of said article being supported by said first and second frame members.

6. The hand truck of claim 5, wherein said mounting means includes means for non-rotatably securing the vertical wall of said angle iron member to said axle member.

7. The hand truck of claim 5, wherein said mounting means includes a "U"-shaped connector member non-rotatably secured to said axle member, said connector member having a pair of parallel, transversely spaced apart arm members.

8. The hand truck of claim 6, wherein the vertical wall of said angle iron member is secured to said mounting means about mid-length of said angle iron member.

9. The hand truck of claim 7, wherein the vertical wall of said angle iron member is secured to the arm members of said connector member about mid-length of said angle iron member.

10. The hand truck of claim 5, wherein a vertical plane including the axis of rotation of said axle member also includes said apex.

* * * * *